UNITED STATES PATENT OFFICE.

EDWARD W. AYRES, OF WASHINGTON, DISTRICT OF COLUMBIA; SALLIE PEYTON AYRES EXECUTRIX OF SAID EDWARD W. AYRES, DECEASED.

ALIMENTARY PRODUCT AND METHOD OF MAKING SAME.

SPECIFICATION forming part of Letters Patent No. 693,485, dated February 18, 1902.

Application filed November 7, 1901. Serial No. 81,462. (No specimens.)

*To all whom it may concern:*

Be it known that I, EDWARD W. AYRES, of Washington, District of Columbia, have invented a new and useful Improvement in Alimentary Products and Processes of Making the Same, of which the following is a specification.

My invention relates to an improved alimentary product and to the process of making the same.

The object of my invention is to provide a food product which is highly nutritive, in proper condition to be readily digested without any preliminary cooking, and of an agreeable taste.

To this end my invention consists in the new process and product herein described and claimed.

In carrying out my invention I employ as a material from which to produce my improved alimentary product any cereal, such as wheat, barley, oats, &c. However, I find wheat preferable to other grains, since it contains a larger proportion of nitrogenous bodies or proteins and a smaller proportion of starch. The most desirable grain of which I am aware is a species of Russian wheat which is rich in protein bodies. I have found the hard white winter wheats grown in this country, and especially those grown in Washington State, to be next in desirability to the Russian wheat.

My invention relates to thoroughly-cooked grain in the form of flakes and in which the starch and albuminoids or nitrogenous bodies of the flakes are modified by the action of malt and pepsin.

I am aware that both cooked and uncooked cereals impregnated with malt and in a crushed, ground, granulated, or flaked form are old; but my invention differs materially from all prior products and results in a greatly-improved food product.

I will now describe my improved process in detail, taking each step up in its order of sequence.

First. The cereal is thoroughly cleaned and graded. Any well known types of milling machinery may be employed for this purpose. This step results in a loss of about ten per cent. of the cereal, which is rejected by the cleaning and grading machines.

Second. The cleaned cereal is soaked in water for about twenty-four hours, care being taken that the temperature of the water does not fall below 50° Fahrenheit.

Third. The soaked cereal is thoroughly cooked by boiling or steaming under pressure at a temperature of about 305° Fahrenheit. The cooking takes approximately forty-five minutes, depending, of course, on the character of the cereal. During the cooking part of the starch is converted into soluble starch and dextrine.

Fourth. The cooked cereal is rapidly cooled for the purpose of preventing fermentation and softening of the grain, which would occur if the cereal were left to cool slowly. The cooling can be advantageously accomplished by blowing blasts of air through the cooked cereal and should be completed very rapidly, for any fermentation of the cereal at this period would interfere with subsequently producing satisfactory flakes.

Fifth. The cooled cereal is "cured" or air-dried. This step is for the purpose of having the cereal grains uniformly dried throughout and can be conveniently carried out by exposing the grains to the atmosphere.

Sixth. The cereal is then mixed with proper proportions of malt extract, pepsin, and salt. I have found that from eight to seventeen pounds of malt extract and approximately one-half pound of pepsin to every hundred pounds of cereal gives good results; but the proportions vary with the character of the cereal and malt employed. The malt and pepsin are for the purpose of modifying the starch, dextrine, and nitrogenous bodies of the cereal during a subsequent part of my process, and the salt is merely to assist in giving an agreeable taste to the finished product.

Seventh. The mixture of cereal, malt, pepsin, and salt is then passed through rollers, which may be heated, for the purpose of flattening the cereal grains into thin moist flakes.

Eighth. The thin moist flakes so produced are then raised to a temperature of approximately 135° to 145° Fahrenheit and carefully maintained at such temperature for approximately an hour. During the time that the flakes are maintained at this temperature it is of paramount importance that they be subjected to a current of dry air; otherwise the flakes will become soft, lose their regular shape, and cake together. I have found it most desirable in carrying out this step to subject the flakes to a blast of air heated to from 135° to 145° Fahrenheit. During this step of my process the starch, dextrine, and nitrogenous bodies contained in the thin flakes exist in intimate contact with the malt and pepsin and are in a condition most favorable for a rapid action of the pepsin and of the diastase and peptase of the malt. Under such conditions I find that the starch, dextrine, and nitrogenous bodies are materially modified without causing the flakes to become soft, lose their shape, or cake together. At the temperature of from 135° to 145° Fahrenheit the diastase acts to convert the starch into a maximum of dextrine and a minimum of maltose, and I have found such temperature to be that best suited for the action of the pepsin and peptase in converting the albuminoids or nitrogenous bodies into peptones. I thus obtain flakes of regular form, not caked together, and containing a maximum of peptones and dextrine and a minimum of albuminoids and maltose.

Ninth. Immediately after the completion of the last step the flakes are toasted or baked. I have found a temperature from 200° to 325° Fahrenheit suitable for this purpose. A lower temperature is apt to produce tough flakes, and at a higher temperature the flakes char more or less. The flakes can be baked in the oven of a kitchen-stove or in an ordinary baker's oven of the reel type. The finished product consists of thin crisp flakes thoroughly cooked containing malt and pepsin and a minimum proportion of maltose and albuminoids.

Having thus described my invention, I claim as new and desire to secure by Letters Patent—

1. The improved process for the manufacture of an alimentary, cereal product, which consists in cooking and properly preparing the cereal for flaking, mixing malt and pepsin with the cereal, flaking the cereal, maintaining the flakes at a temperature suitable for the action of the malt and pepsin and simultaneously subjecting the flakes to a current of dry air, and then cooking the flakes.

2. The improved process for the manufacture of an alimentary, cereal product, which consists in, first, soaking the cereal; second, cooking the cereal; third, cooling the cooked cereal; fourth, curing or drying the cereal; fifth, mixing malt and pepsin with the cereal; sixth, flaking the grains of cereal; seventh, maintaining the flakes at a temperature from 135° to 145° Fahrenheit and simultaneously subjecting them to a current of dry air, and, eighth, cooking the flakes, substantially as described.

3. The new alimentary, cereal product in the form of thin crisp flakes, impregnated with both malt and pepsin, the flakes containing a maximum of dextrine and peptones, as described.

In testimony whereof I hereunto set my hand, this 5th day of November, 1901, in the presence of two attesting witnesses.

EDWARD W. AYRES.

Witnesses:
MINA G. OLCOTT,
E. V. BROOKSHIRE.